(12) United States Patent
Xia et al.

(10) Patent No.: US 7,890,833 B2
(45) Date of Patent: Feb. 15, 2011

(54) WIRELESS COMMUNICATION USING CODEWORD ENCODED WITH HIGH-RATE CODE

(75) Inventors: Bo Xia, Cupertino, CA (US); Minnie Ho, Los Altos, CA (US); Eric Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1083 days.

(21) Appl. No.: 11/617,363

(22) Filed: Dec. 28, 2006

(65) Prior Publication Data
US 2007/0300125 A1 Dec. 27, 2007

Related U.S. Application Data

(60) Provisional application No. 60/812,458, filed on Jun. 8, 2006.

(51) Int. Cl.
*H03M 10/00* (2006.01)

(52) U.S. Cl. ......... 714/752; 714/774; 714/796
(58) Field of Classification Search ......... 714/752, 714/774, 800, 790, 798, 804, 799, 785, 758
See application file for complete search history.

(56) References Cited

U.S. PATENT DOCUMENTS

| | | | |
|---|---|---|---|
| 7,000,174 B2 * | 2/2006 | Mantha et al. | 714/790 |
| 7,058,873 B2 | 6/2006 | Song et al. | |
| 7,213,193 B2 * | 5/2007 | Kim et al. | 714/774 |
| 7,222,284 B2 * | 5/2007 | Stolpman | 714/774 |
| 7,292,198 B2 * | 11/2007 | Shtrom et al. | 343/795 |
| 7,421,644 B2 * | 9/2008 | Mantha et al. | 714/800 |
| 2006/0109821 A1 | 5/2006 | Xia | |
| 2007/0022362 A1 * | 1/2007 | Yue et al. | 714/790 |

* cited by examiner

*Primary Examiner*—Fritz Alphonse
(74) *Attorney, Agent, or Firm*—Schwabe, Williamson & Wyatt, P.C.

(57) ABSTRACT

Embodiments of the present invention provide methods and apparatus for wireless communication using codeword with high-rate codes. Other embodiments may be described and claimed.

18 Claims, 5 Drawing Sheets

500  Decoder Codeword Memory    N Bits

502  High-efficiency codeword with R = 3/4    Parity Bits

504  Low-Rate codeword for High gain or IR    Parity bits for R = 1/3

FIG. 6

WIRELESS COMMUNICATION USING CODEWORD ENCODED WITH HIGH-RATE CODE

CROSS REFERENCE TO RELATED APPLICATIONS

The present application claims priority to U.S. patent application Ser. No. 60/812,458, filed Jun. 8, 2006, entitled "LDPC Codes with Both Low Complexity and Incremental Redundancy," the entire disclosure of which is hereby incorporated by reference in its entirety.

TECHNICAL FIELD

Embodiments of the present invention relate generally to the field of wireless communications, and more particularly, to methods and apparatus for codeword size selection providing incremental redundancy capabilities with limited complexity.

BACKGROUND

Systems using Incremental Redundancy often suffer from unnecessary complexity since a code with a low-rate mother code is used for most transmissions. To date, an example of code typically used is a Turbo Code, and decoding is usually done at a low, mother-code rate, which places high processing requirements on the decoder for high-throughput systems.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and apparatus for codeword size selection providing incremental redundancy capabilities with limited complexity.

Figure 1:
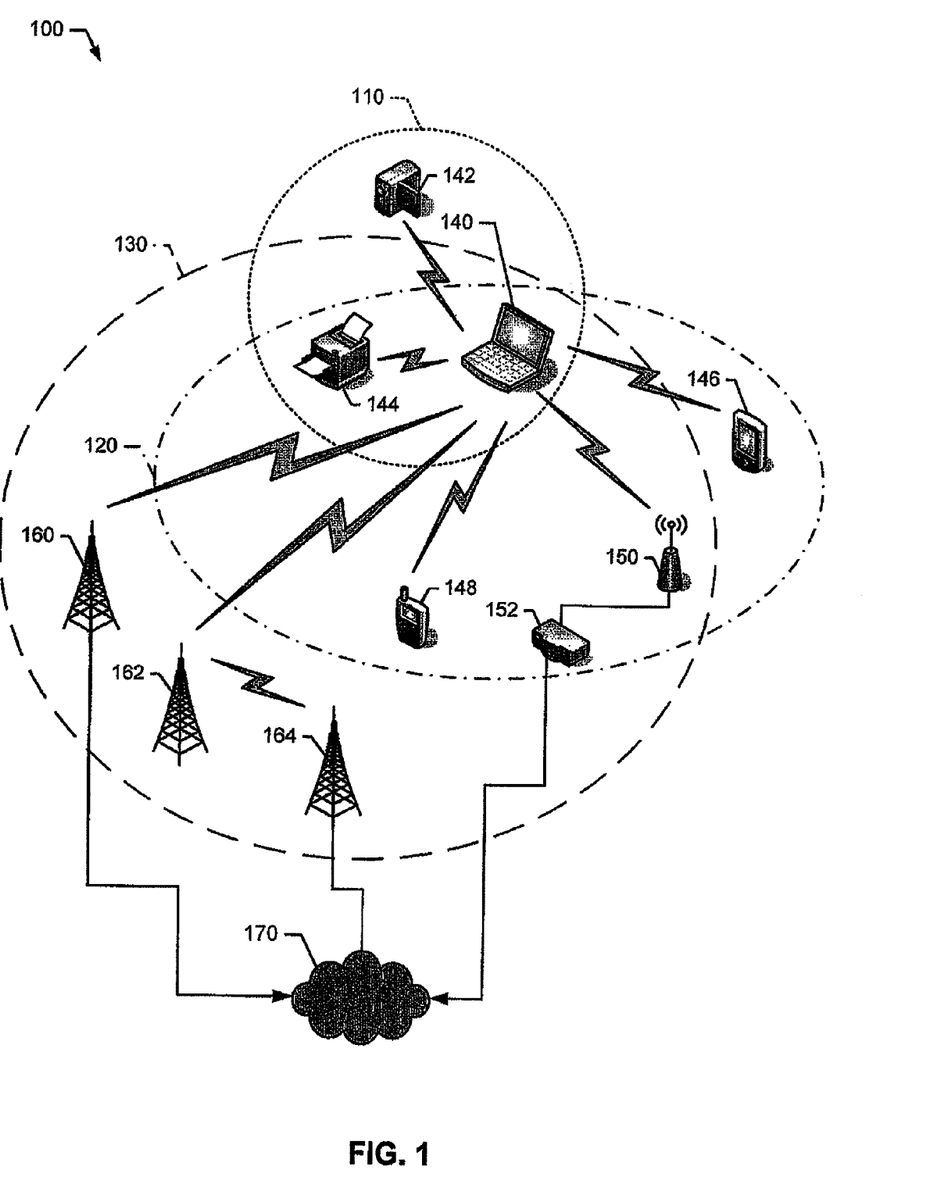
FIG. 1 is a schematic diagram representation of an example wireless communication system according to an embodiment of the methods and apparatus disclosed herein.

Referring to FIG. 1, an example wireless communication system 100, in accordance with various embodiments of the present invention, may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
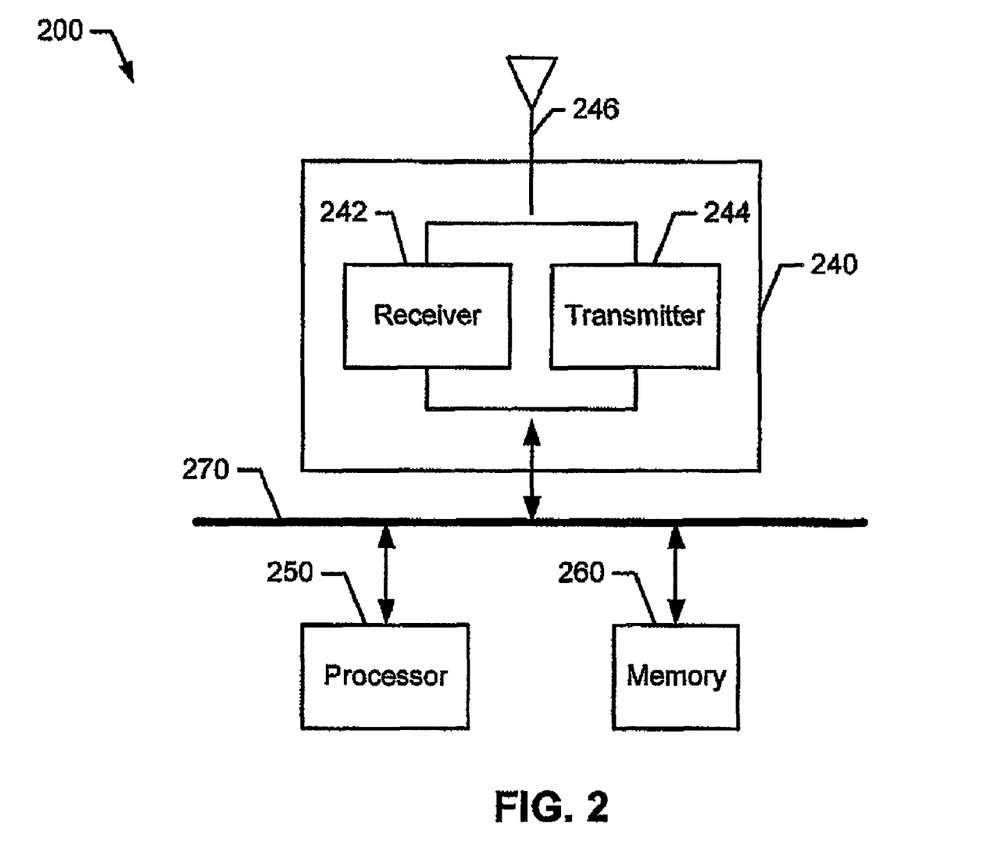
FIG. 2 is a block diagram representation of an example base station of the example wireless communication system of FIG. 1.

Referring to FIG. 2, a base station 200 may include a network interface device (NID) 240, a processor 250, and a memory 260. The NID 240, the processor 250, and the memory 260 may be operatively coupled to each other via a bus 270. While FIG. 2 depicts components of the base station 200 coupling to each other via the bus 270, these components may be operatively coupled to each other via other suitable direct or indirect connections (e.g., a point-to-point connection or a point-to-multiple point connection).

The NID 240 may include a receiver 242, a transmitter 244, and an antenna 246. The base station 200 may receive and/or transmit data via the receiver 242 and the transmitter 244, respectively. The antenna 246 may include one or more directional or omnidirectional antennas such as dipole antennas, monopole antennas, patch antennas, loop antennas, microstrip antennas, and/or other types of antennas suitable for transmission of radio frequency (RF) signals. Although FIG. 2 depicts a single antenna, the base station 200 may include additional antennas. For example, the base station 200 may include a plurality of antennas to implement a multiple-input-multiple-output (MIMO) system.

Although the components shown in FIG. 2 are depicted as separate blocks within the base station 200, the functions performed by some of these blocks may be integrated within a single semiconductor circuit or may be implemented using two or more separate integrated circuits. For example, although the receiver 242 and the transmitter 244 are depicted as separate blocks within the NID 240, the receiver 242 may be integrated into the transmitter 244 (e.g., a transceiver). The methods and apparatus described herein are not limited in this regard.

In accordance with various embodiments of the present invention, a Low Density Parity Check (LDPC) code with Incremental Redundancy capabilities is used for communication within a wireless network. Complexity of the LDPC is limited by selection of a maximum codeword size. This allows high-rate codewords to still be transmitted at their most efficient configuration, i.e., the longest codeword size with decoding computations performed only on the transmitted bits, and Incremental Redundancy to be used with shorter codewords when the need arises. This provides a desirable tradeoff between complexity, performance, and access to Incremental Redundancy that is difficult to achieve by any other means. While the present invention is described with respect to LDPC code, those skilled in the art will understand that other types of code may be used, in accordance with various embodiments of the present invention.

Current systems using Incremental Redundancy (e.g., High Speed Downlink Packet Access (HSDPA)) usually use a Turbo Code with a rate R=⅓ mother code. This means that all packets must be decoded at the R=⅓ rate, regardless of the code rate used in transmission. For high rates, like R=½, ¾, or higher, the mother code is punctured up to the desired rate. For the purpose of this application, including the claims, the term high rate shall mean R>⅓. In the decoder the punctured bits are restored as minimum metric bits and decoded as a rate R=⅓ codeword. This means that if the channel throughput rate is 100 Mbps (mega bits per second) (as is desired in 3GPP/LTE ($3^{rd}$ Generation Partnership Project/Long Term Evolution)), the decoder must process 300 Mbps of coded bits regardless of the transmitted code rate. This scheme does, however, allow Incremental Redundancy to be used relatively easily.

In accordance with various embodiments of the present invention, using an LDPC code for communication within a wireless network, only the transmitted bits need to be processed. So if the decoder is designed with just enough processing capability to handle the maximum channel bit rate (for example, 120 Mbps), then the decoder may process any code rate codeword transmitted in the network. This is possible using the type of structured codes specified in Institute of Electrical and Electronics Engineers (IEEE) 802.16e (2006) and 802.11n (working group), which also allow flexible block sizes. Such a scheme does not, however, generally lend itself well to Incremental Redundancy since the H-matrices do not support computation of additional parity bits and the decoder would then have to be over-designed (as with a Turbo Code) to be able to process them in the receiver.

Figure 3:
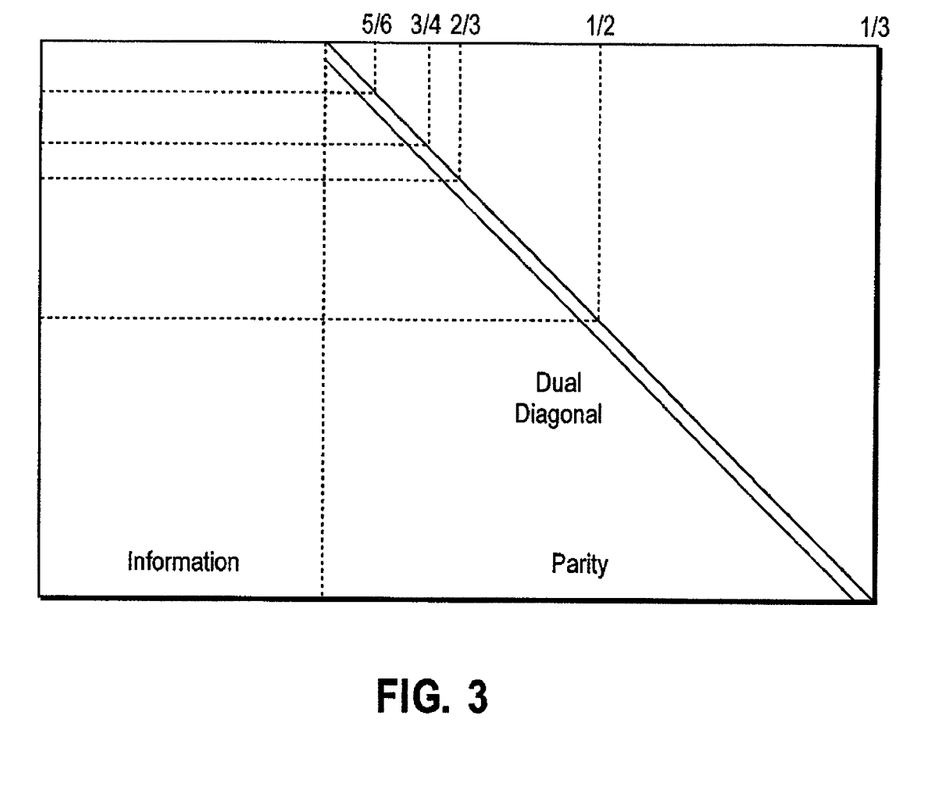
FIG. 3 illustrates a basic configuration, in accordance with various embodiments, of LDPC parity check matrices for support of Incremental Redundancy or rate adjustment.

FIG. 3 illustrates a basic configuration, in accordance with various embodiments, of LDPC parity check matrices for support of Incremental Redundancy or rate adjustment. The dual-diagonal structure in the parity check portion of the matrix allows parity-check bit computation to stop when the desired code rate is reached. In accordance with various embodiments, the code rate may be subsequently lowered by continuing computation of the parity check bits. In accordance with various embodiments, in the decoder only the populated portion of the H-matrix needs to be computed, so the decoder only needs to compute the transmitted bits.

Figure 4:
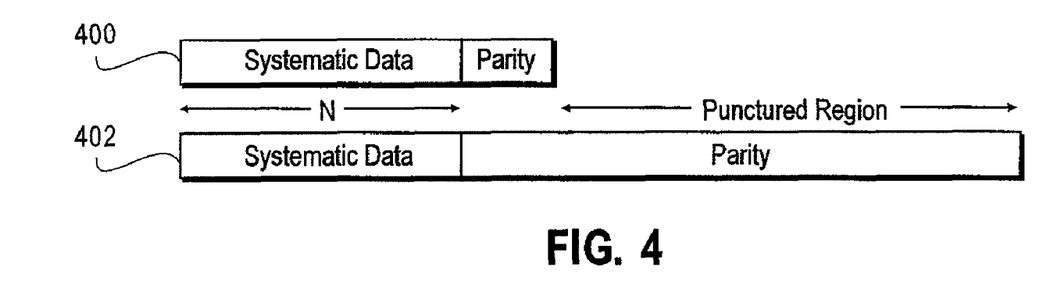
FIG. 4 schematically illustrates a difference in codeword bits (and associated support memory) between a system using a native high-rate code and a system using a low-rate mother-code.

FIG. 4 illustrates a difference in codeword bits (and associated support memory) between a system (400) using a native high-rate code (such as, for example, an LDPC) and a system (402) using a low-rate mother-code, such as, for example, a Turbo Code. For the low-rate mother-code case the punctured region must also be computed in the decoder, even though it contains no information.

Figure 5:
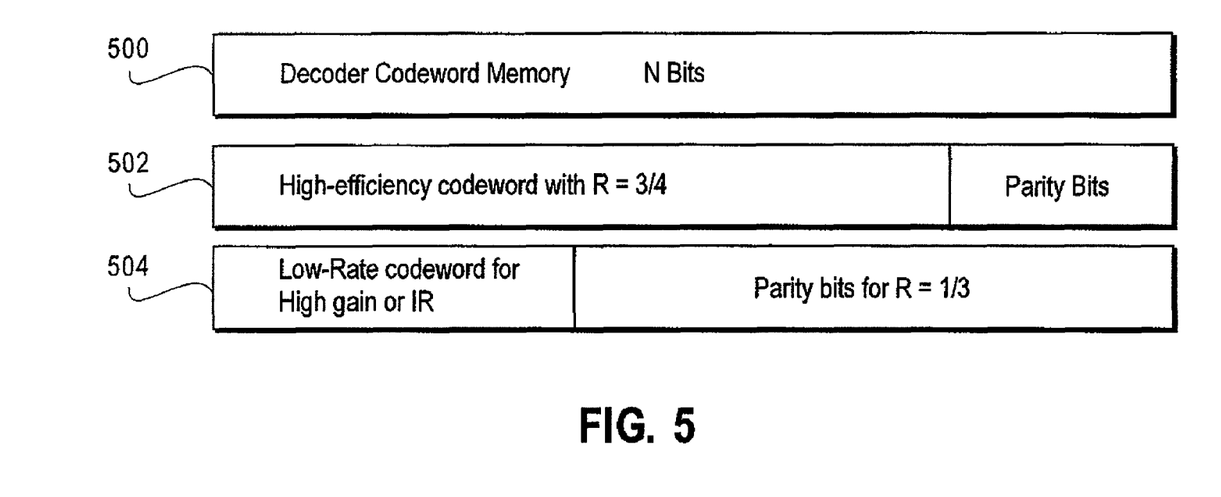
FIG. 5 schematically illustrates codeword decoding, in accordance with various embodiments of the present invention.

With reference to FIG. 5, in accordance with various embodiments of the present invention, a fixed amount of memory (500), N bits, is allocated for codeword processing within a decoder and this bounds the complexity (and maximum coding gain) of a wireless network. When high-code-rate, high-efficiency packets are desired, which is expected to be most of the traffic for a system such as, for example, 3GPP/LTE, then, in accordance with various embodiments, the expansion factors for the high-rate portion of the H-matrix may be adjusted to make use of the full length of the codeword memory and maximum performance may be achieved (502). When Incremental Redundancy (IR) is desired, in accordance with various embodiments the expansion factors may be reduced such that the desired mother code rate (for example R=½ or R=⅓) fits in the codeword memory for a maximum mother code length of N bits (504). The initial transmitted codeword at some high initial rate may be shorter than N bits, but if IR retransmissions ultimately populated the entire N bits, the decoder will then still have the capability to decode it.

In accordance with various embodiments, codewords are also encoded based upon factors discussed herein. Such factors include, but are not limited to, desired Incremental Redundancy, code rate level, efficiency, etc. The codewords are encoded, in accordance with various embodiments, with a native high-rate code, such as, for example, LDPC code and transmitted within a wireless communication system.

Although the methods and apparatus described herein may be associated with the Third Generation Partnership Project (3GPP) for the Long Term Evolution (LTE), the methods and apparatus described herein may be readily applicable with other suitable wireless technologies, protocols, and/or standards. The methods and apparatus described herein are not limited in this regard.

Figure 6:
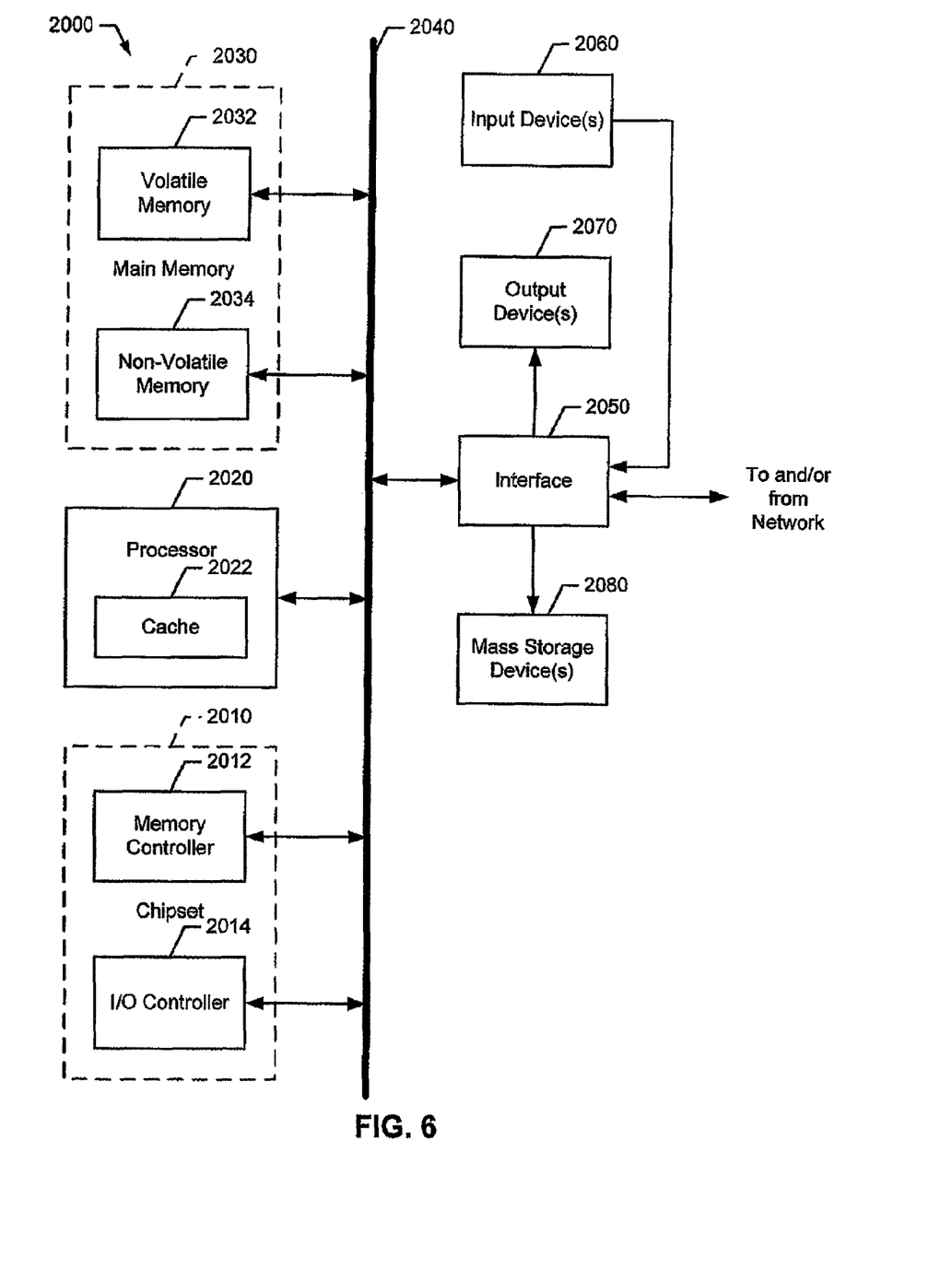
FIG. 6 is a block diagram representation of an example processor system that may be used to implement various aspects of the present invention.

FIG. 6 is a block diagram of an example processor system 2000 adapted to implement methods and apparatus disclosed herein. The processor system 2000 may be a desktop computer, a laptop computer, a handheld computer, a tablet computer, a PDA, a server, an Internet appliance, a base station, an access point and/or any other type of computing device.

The processor system 2000 illustrated in FIG. 6 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. In various embodiments, I/O controller 2014 of chipset 2010 may be endowed with all or portions of the teachings of the present invention described above. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface. In various embodiments, interface circuit 2050 may be endowed with all or portions of the teachings of the present invention described above.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc. In various embodiments, interface circuit 2050 may be endowed with all or portions of the teachings of the present invention described above.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
allocating, by a receiver within a wireless communication system, a fixed amount of memory for codeword processing;
receiving, at the receiver, a codeword encoded with a high code rate;
adjusting expansion factors for a high-rate portion of an H-matrix of a low-density parity check code (LDPC) to fully utilize the fixed amount of memory in decoding of the codeword;
determining that incremental redundancy is desired; and
reducing the expansion factors, based on said determining that the incremental redundancy is desired, such that a desired mother code rate fits in the fixed amount of memory for a mother codeword length corresponding to a size of the fixed amount of memory.

2. The method of claim 1, further comprising:
determining, at the receiver, the desired mother code rate for the received codeword based upon the expansion factors.

3. The method of claim 1, wherein adjusting and reducing expansion factors is based on a desired amount of incremental redundancy and efficiency of information transmitted.

4. The method of claim 1, wherein the high rate code is greater than $1/3$.

5. The method of claim 1, wherein the fixed amount of memory is N bits, N being an integer, and said reducing the expansion factors is done such that a second codeword, encoded at a mother code rate and having a length of N bits, would be accommodated by the fixed amount of memory.

6. The method of claim 5, further comprising:
receiving a third codeword encoded at a rate greater than the mother code rate and having a length less than N bits; and
utilizing the fixed amount of memory in decoding of the third codeword along with an incremental redundant transmission.

7. An apparatus comprising:
a receive block adapted to receive a codeword encoded with a high code rate; and
a decode block configured:
to allocate a fixed amount of memory for codeword processing;
to adjust expansion factors for a high-rate portion of an H-matrix to fully utilize the fixed amount of memory in decoding of the codeword;
to determine that incremental redundancy is desired; and
to reduce, based on said determination that incremental redundancy is desired, the expansion factors such that a desired mother code rate fits in the fixed amount of memory for a mother codeword length corresponding to a size of the fixed amount of memory.

8. The apparatus of claim 7, wherein the decode block is further configured to determine the desired mother code rate based upon the expansion factors.

9. The apparatus of claim 8, wherein the decode block is configured to adjust and reduce expansion factors based on a desired amount of incremental redundancy and efficiency of information transmitted.

10. The apparatus of claim 7, wherein the codeword is encoded with a low density parity check code.

11. The apparatus of claim 7, further comprising an encode block adapted to encode codewords with the high code rate and a transmit block adapted to transmit encoded codewords that do not exceed a maximum number of bits for the wireless network.

12. The apparatus of claim 11, wherein the transmit block and the receive block are part of a transceiver having at least one common component.

13. The apparatus of claim 7, wherein the high code rate is greater than ⅓.

14. An article of manufacture comprising:
a storage medium; and
a set of instructions stored in the storage medium, which when executed by a processor causes an apparatus to perform operations comprising:
allocating a fixed amount of memory for codeword processing;
determining whether incremental redundency is desired; and
adjusting expansion factors of a low density parity check code based on said determining of whether incremental redundancy is desired, wherein the expansion factors are adjusted such that a desired mother code rate fits in the fixed amount of memory for a mother codeword length corresponding to a size of the fixed amount of memory.

15. The article of manufacture of claim 14, wherein the operations further comprise:
determining the desired mother code rate based upon expansion factors.

16. The article of manufacture of claim 15, wherein adjusting the expansion factors further comprise:
adjusting the expansion factors based further on a desired efficiency of information transmitted.

17. The article of manufacture of claim 14, wherein the high code rate is greater than ⅓.

18. The article of manufacture of claim 14, wherein the operations further comprise:
providing, when it is determined that incremental redundancy is not desired, the expansion factors at first levels such that decoding of a first codeword, encoded at a high code rate, fully utilizes the fixed amount of memory; and
providing, when it is determined that incremental redundancy is desired, the expansion factors at second levels such that decoding of a second codeword, encoded at the high code rate, utilizes a first subset of the fixed amount of memory and an incremental redundant transmission utilizes a second subset of the fixed amount of memory.

* * * * *